United States Patent
Kumar et al.

(10) Patent No.: US 11,595,924 B2
(45) Date of Patent: Feb. 28, 2023

(54) SCAN-BASED SYNCHRONIZATION SIGNAL BLOCK (SSB) CONFIGURATION FOR A BASE STATION

(71) Applicant: QUALCOMM Incorporated, San Diego, CA (US)

(72) Inventors: Satish Kumar, Hyderabad (IN); Sudeepta Kumar Nath, Sambalupur (IN); Loksiva Paruchuri, Hyderabad (IN); Tushar Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/112,223

(22) Filed: Dec. 4, 2020

(65) Prior Publication Data

US 2022/0182954 A1    Jun. 9, 2022

(51) Int. Cl.
*H04B 7/022* (2017.01)
*H04B 7/12* (2006.01)
(Continued)

(52) U.S. Cl.
CPC ........ *H04W 56/0015* (2013.01); *H04B 7/022* (2013.01); *H04B 7/12* (2013.01);
(Continued)

(58) Field of Classification Search
CPC ... H04B 7/02–12; H04B 17/0082–3913; H04J 11/0023–0093; H04J 2011/0003–0096; H04L 5/0001–26; H04W 8/22–245; H04W 24/02–10; H04W 28/02–26; H04W 36/0005–385; H04W 48/02–20; H04W 56/0005–0095; H04W 72/005–14; H04W 74/002–0891;
(Continued)

(56) References Cited

U.S. PATENT DOCUMENTS

| 2018/0213493 A1 | 7/2018 | Chakraborty et al. |
| 2020/0314861 A1* | 10/2020 | Goel ............... H04W 56/0015 |
| 2021/0092629 A1* | 3/2021 | Fang ................. H04W 48/08 |

FOREIGN PATENT DOCUMENTS

| CN | 104796242 A | 7/2015 |
| EP | 3920614 A1 | 12/2021 |
| WO | WO-2020164408 A1 | 8/2020 |

OTHER PUBLICATIONS

International Search Report and Written Opinion—PCT/US2021/072034—ISA/EPO—dated Feb. 9, 2022.

* cited by examiner

Primary Examiner — Timothy J Weidner
(74) Attorney, Agent, or Firm — Norton Rose Fulbright US LLP

(57) ABSTRACT

A method of wireless communication includes, in response to a trigger event detected at a first base station, performing, by the first base station, a scan of a plurality of frequencies for a synchronization signal block (SSB) transmission from a second base station. The plurality of frequencies correspond to a plurality of global synchronization channel numbers (GSCNs) associated with the first base station and the second base station. The first base station is associated with a first coverage area that is at least partially within a second coverage area associated with the second base station. The method further includes transmitting, by the first base station, one or more SSBs having an SSB configuration that is based on a result of the scan.

30 Claims, 6 Drawing Sheets

(51) Int. Cl.
*H04B 17/318* (2015.01)
*H04B 17/382* (2015.01)
*H04J 11/00* (2006.01)
*H04L 5/00* (2006.01)
*H04W 24/02* (2009.01)
*H04W 24/10* (2009.01)
*H04W 56/00* (2009.01)
*H04W 72/04* (2009.01)
*H04W 84/02* (2009.01)
*H04W 88/08* (2009.01)
*H04W 92/02* (2009.01)
*H04W 92/10* (2009.01)
*H04W 92/20* (2009.01)
*H04W 72/0453* (2023.01)

(52) U.S. Cl.
CPC ......... *H04B 17/318* (2015.01); *H04B 17/382* (2015.01); *H04J 11/0056* (2013.01); *H04J 11/0093* (2013.01); *H04L 5/0032* (2013.01); *H04L 5/0073* (2013.01); *H04W 24/02* (2013.01); *H04W 24/10* (2013.01); *H04W 56/0005* (2013.01); *H04W 72/0426* (2013.01); *H04W 72/0453* (2013.01); *H04J 2011/0016* (2013.01); *H04J 2011/0096* (2013.01); *H04W 84/02* (2013.01); *H04W 88/08* (2013.01); *H04W 92/02* (2013.01); *H04W 92/10* (2013.01); *H04W 92/20* (2013.01)

(58) Field of Classification Search
CPC ........... H04W 84/005–22; H04W 88/005–188; H04W 92/02–24
See application file for complete search history.

US 11,595,924 B2

SCAN-BASED SYNCHRONIZATION SIGNAL BLOCK (SSB) CONFIGURATION FOR A BASE STATION

TECHNICAL FIELD

Aspects of the present disclosure relate generally to wireless communication systems, and more particularly, to wireless communication systems that use synchronization signal blocks (SSBs).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes, in response to a trigger event detected at a first base station, performing, by the first base station, a scan of a plurality of frequencies for a synchronization signal block (SSB) transmission from a second base station. The plurality of frequencies correspond to a plurality of global synchronization channel numbers (GSCNs) associated with the first base station and the second base station. The first base station is associated with a first coverage area that is at least partially within a second coverage area associated with the second base station. The method further includes transmitting, by the first base station, one or more SSBs having an SSB configuration that is based on a result of the scan.

In some other aspects of the disclosure, an apparatus for wireless communication includes a receiver configured to perform, in response to a trigger event detected at a first base station, a scan of a plurality of frequencies for an SSB transmission from a second base station. The plurality of frequencies correspond to a plurality of GSCNs associated with the first base station and the second base station. The first base station is associated with a first coverage area that is at least partially within a second coverage area associated with the second base station. The apparatus further includes a transmitter configured to transmit one or more SSBs having an SSB configuration that is based on a result of the scan.

In some other aspects of the disclosure, a non-transitory computer-readable medium stores instructions executable by a processor to initiate, perform, or control operations. The operations include, in response to a trigger event detected at a first base station, performing, by the first base station, a scan of a plurality of frequencies for an SSB transmission from a second base station. The plurality of frequencies correspond to a plurality of GSCNs associated with the first base station and the second base station. The first base station is associated with a first coverage area that is at least partially within a second coverage area associated with the second base station. The operations further include transmitting, by the first base station, one or more SSBs having an SSB configuration that is based on a result of the scan.

In some examples of the non-transitory computer-readable medium, the result of the scan may indicate that a particular frequency is unused by the second base station for the SSB transmission, the particular frequency may correspond to a particular GSCN of the plurality of GSCNs, and the first base station may transmit the one or more SSBs using the particular frequency.

In some examples of the non-transitory computer-readable medium, the result of the scan may indicate that one or more SSB indices are unused by the second base station for the SSB transmission, and the first base station may transmit the one or more SSBs based on the one or more SSB indices.

In some examples of the non-transitory computer-readable medium, the operations may further include determining, based on the result of the scan, that each GSCN of the plurality of GSCNs is used by the second base station for the SSB transmission, and based on determining that each GSCN of the plurality of GSCNs is used by the second base station for the SSB transmission, identifying that the one or more SSB indices are unused by the second base station for the SSB transmission.

In some examples of the non-transitory computer-readable medium, the result of the scan may indicate that one of a first portion of a frame or a second portion of the frame is used by the second base station for the SSB transmission, and the first base station may transmit the one or more SSBs during the other of the first portion of the frame or the second portion of the frame.

In some examples of the non-transitory computer-readable medium, the operations may further include determining, based on the result of the scan, that each GSCN of the plurality of GSCNs is used by the second base station for the SSB transmission, determining, based on the result of the scan, that each SSB index of a plurality of SSB indices are used by the second base station for the SSB transmission, and based on determining that each GSCN of the plurality of GSCNs is used by the second base station for the SSB transmission and that each SSB index of the plurality of SSB indices are used by the second base station for the SSB transmission, identifying that the other of the first portion of the frame or the second portion of the frame is unused by the second base station for the SSB transmission.

In some examples of the non-transitory computer-readable medium, the result of the scan may indicate that a particular frequency, one or more SSB indices, and a particular frame portion are unused by the second base station for the SSB transmission, and the SSB configuration may include the particular frequency, the one or more SSB indices, and the frame portion.

In some other aspects of the disclosure, an apparatus for wireless communication includes means for performing, in response to a trigger event detected at a first base station, a scan of a plurality of frequencies for an SSB transmission from a second base station. The plurality of frequencies correspond to a plurality of GSCNs associated with the first base station and the second base station. The first base station is associated with a first coverage area that is at least partially within a second coverage area associated with the second base station. The apparatus further includes means for transmitting, by the first base station, one or more SSBs having an SSB configuration that is based on a result of the scan.

In some examples of the apparatus, the trigger event may include a boot-up operation of the first base station.

In some examples of the apparatus, the trigger event may include expiration of a threshold time interval since a previous calibration operation performed by the first base station.

In some examples of the apparatus, the scan may correspond to a network listening (NL) scan.

In some examples of the apparatus, the NL scan may include at least one of a plurality of operations included in a cell acquisition process performed by a user equipment (UE) to establish communications with the first base station based on the one or more SSBs.

DETAILED DESCRIPTION

Figure 1:
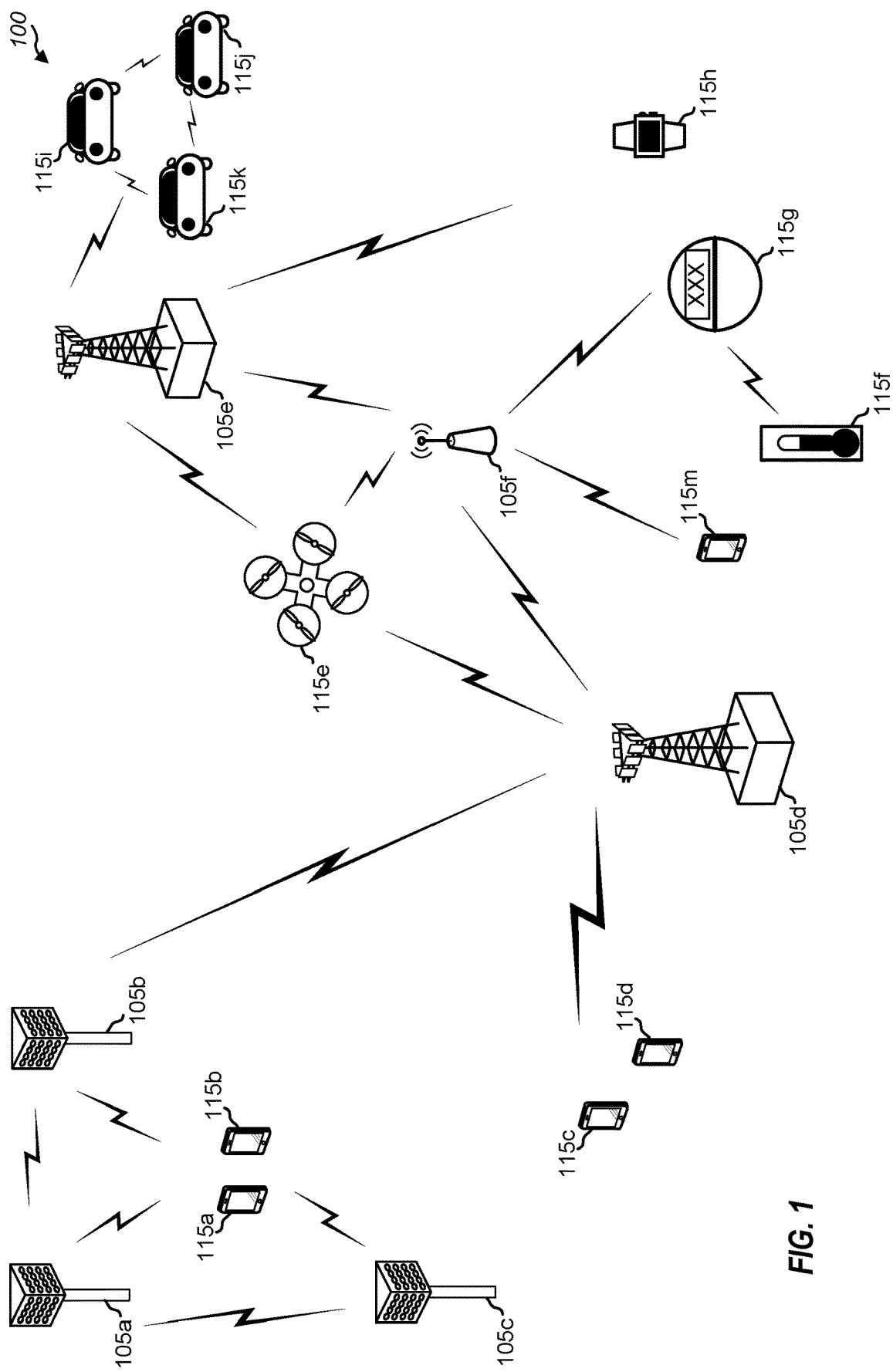
FIG. 1 is a block diagram illustrating an example of a wireless communication system according to some aspects of the disclosure.

Wireless communication systems are increasingly used to provide high speed data communications to a wide variety of electronic devices, such as cellular phones, vehicle communication systems, sensors, and other devices. In some cases, a large number of devices in communication with a base station of a wireless communication system may exceed a capacity of the base station.

To reduce or avoid such situations, small cell base stations may be used to improve network performance. For example, a small cell base station may be positioned in a particularly busy location (such as a building with a large number of occupants) to reduce a load on a macro base station. Alternatively or in addition, a small cell base station may be positioned to fill a coverage "gap" associated with the macro base station, such as near an edge of a coverage area of the macro base station or in a "dead" zone that may be associated with the macro base station in some circumstances. Examples of small cell base stations include femtocells, picocells, microcells, nanocells, and other types of small cells.

In some cases, wireless signals of a macro base station and a small cell base station may collide or interfere with one another. For example, if a coverage area of the macro base station overlaps a coverage area of the small cell base station, then signals transmitted concurrently by the macro base station and the small cell base station may collide or interfere with one another. Further, attempting to coordinate communications by the macro base station and the small cell base station (such as using a multiple-access technique) may be relatively inefficient.

A small cell base station in accordance with some aspects of the disclosure may perform a scan to detect a synchronization signal block (SSB) configuration of a macro base station. The small cell base station may determine, based on the SSB configuration of the macro base station, another SSB configuration for one or more SSBs transmitted by the small cell base station. For example, the SSB configuration of the small cell base station may have one or more of a frequency, a time index, or a frame portion that differs with respect to the SSB configuration of the macro base station. As a result, collisions and interference between SSBs transmitted by the macro base station and the small cell base station may be reduced or avoided. In some examples, the scan performed by the small cell base station may include or correspond to a network listening (NL) scan. In an illustrative example, the NL scan may include one or more operations of a cell acquisition process performed by a user equipment (UE) to scan for SSBs and to establish communications with a base station.

Reducing or avoiding collisions and interference between SSBs may improve performance of a wireless communication system. For example, by reducing or avoiding collisions and interference between SSBs, UE devices may receive SSBs with a greater signal-to-noise ratio (SNR) and may enable the UE devices to connect with base stations more rapidly. In some cases, reducing or avoiding collisions and interference between SSBs may avoid a situation in which a UE connects with a more distant base station due to detecting interference or collisions associated with SSBs from a nearby base station. As a result, a UE device may connect to base stations more rapidly, may perform improved selection of base stations for communication, or both.

In some cases, reducing or avoiding collisions and interference between SSBs may reduce power consumption by a base station, by a UE device, or both. To illustrate, collisions and interference between SSBs may cause a UE device to measure and report a relatively poor received signal strength to a base station (even if the base station is near to the UE device in some circumstances). To compensate for the poor received signal strength reported by the UE, the base station may increase transmission power levels used by the base station and the UE device. By reducing or avoiding collisions and interference between SSBs, the UE device may detect and report a greater received signal strength, and the base station may select lower transmission power levels, resulting in power savings by the base station and the UE device.

To further illustrate, certain aspects of the disclosure may be used in connection with networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10s of bits/sec), ultra-low energy (e.g., ~10+ years of battery life), and deep coverage with the capability to reach challenging locations; (2) including ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node, a portable access point, or another small cell base station. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d and 115m of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts. The small cell base station 105f may serve one or more UEs 115, such as the UE 115m.

Wireless network 100 of implementations supports communications with ultra-reliable and redundant links for devices, such as UE 115e. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
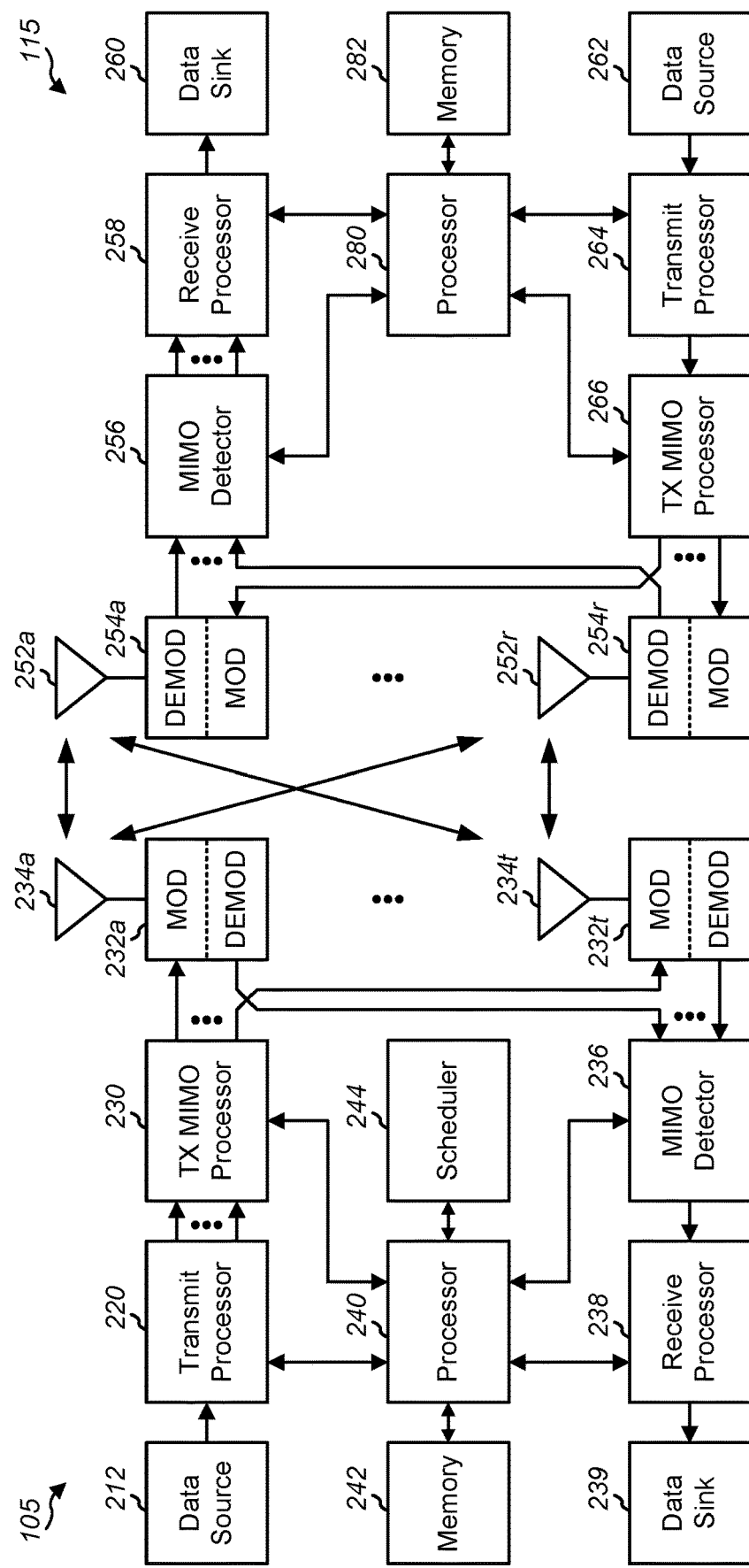
FIG. 2 is a block diagram conceptually illustrating examples of a base station and a UE according to some aspects of the disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for the physical uplink shared channel (PUSCH)) from data source 262 and control information (e.g., for the physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 and/or other processors and modules at base station 105 and/or processor 280 and/or other processors and modules at UE 115 may perform or direct the execution of various processes for the techniques described herein, such as to perform or direct the execution illustrated in FIG. 4 and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
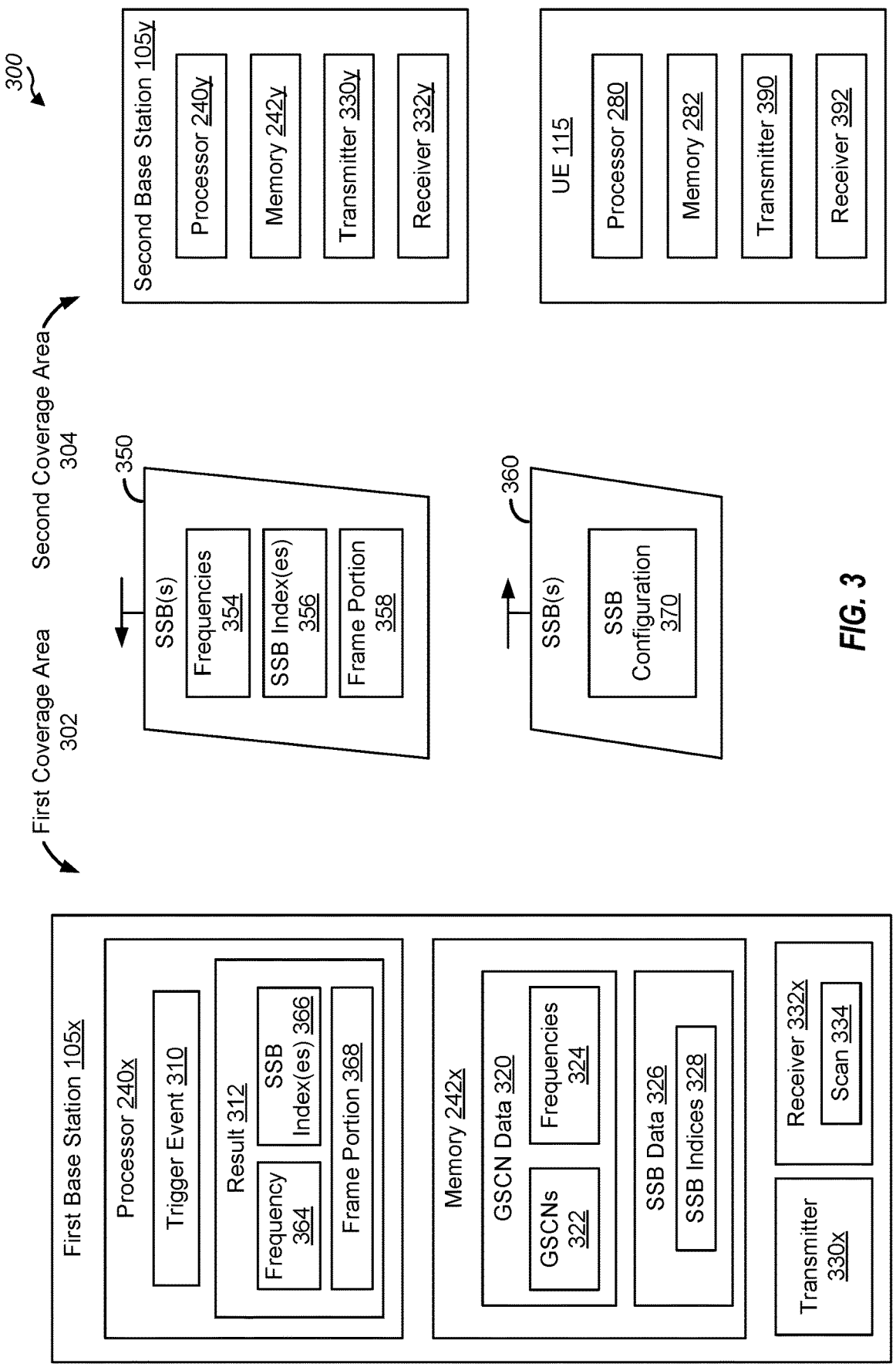
FIG. 3 is a block diagram illustrating an example of a wireless communication system according to some aspects of the disclosure.

FIG. 3 is a block diagram illustrating an example of a wireless communication system 300 according to some aspects of the disclosure. The wireless communication system 300 may include one or more base stations, such as a first base station 105x and a second base station 105y. The wireless communication system 300 may include one or more UEs, such as a UE 115.

In some examples, the first base station 105x corresponds to a small cell base station (e.g., the small cell base station 105f) having a first coverage area 302, and the second base station 105y corresponds to a macro base station (e.g., the macro base station 105d or the macro base station 105e) having a second coverage area 304. The first coverage area 302 may be at least partially within the second coverage area 304. For example, the second coverage area 304 may at least partially overlap the first coverage area 302. In some such examples, the wireless communication system 300 includes or corresponds to an overlay or heterogeneous network. Depending on the particular example, the first base station 105x may correspond to a femtocell, a picocell, a microcell, a nanocell, or another small cell. In some examples, the first coverage area 302 is less than the second coverage area 304. In some examples, the first base station 105x and the second base station 105y communicate using a common wireless communication protocol (such as a 5G NR wireless communication protocol) and using a common set of communication frequencies (such as frequencies specified by the 5G NR wireless communication protocol).

The first base station 105x may include one or more processors (such as a processor 240x), one or more memories (such as a memory 242x), a transmitter 330x, and a receiver 332x. In some examples, the transmitter 330x and the receiver 332x include one or more components described with reference to FIG. 2, such as one more of the modulator/demodulators 232a-t, the MIMO detector 236, the receive processor 238, the transmit processor 220, and the TX MIMO processor 230.

The second base station 105y may include one or more processors (such as a processor 240y), one or more memories (such as a memory 242y), a transmitter 330y, and a receiver 332y. In some examples, the transmitter 330y and the receiver 332y include one or more components described with reference to FIG. 2, such as one more of the modulator/demodulators 232a-t, the MIMO detector 236, the receive processor 238, the transmit processor 220, or the TX MIMO processor 230.

The UE 115 may include one or more processors (such as the processor 280), one or more memories (such as the memory 282), a transmitter 390, and a receiver 392. In some examples, the transmitter 390 and the receiver 392 include one or more components described with reference to FIG. 2, such as one or more of the modulator/demodulators 254*a-r*, the MIMO detector 256, the receive processor 258, the transmit processor 264, or the TX MIMO processor 266.

During operation, the second base station 105*y* may transmit one or more synchronization signal blocks (SSBs) 350 (e.g., using the transmitter 330*y*). In some examples, the one or more SSBs 350 include a physical broadcast channel (PBCH), a primary synchronization signal (PSS), and a secondary synchronization signal (SSS) that forms a synchronization signal (SS) and PBCH block.

In some examples, the second base station 105*y* transmits the one or more SSBs 350 using one or more frequencies 354. In some examples, each SSB of the one or more SSBs 350 is associated with a corresponding SSB index of one or more SSB indices 356. In some examples, the one or more SSB indices 356 identify time domain characteristics of the one or more SSBs 350, such as symbols or time slots during which the second base station 105*y* transmits the one or more SSBs 350. Further, in some wireless communication protocols, the one or more SSBs 350 can be transmitted within a frame portion 358 that may be determined by the second base station 105*y*. To illustrate, a wireless communication protocol may specify that the one or more SSBs may be transmitted in a first portion of a frame (such as a first half of the frame) or in a second portion (such as a second half of the frame) of the frame following the first portion. Accordingly, the second base station 105*y* may select the first portion as the frame portion 358 or the second portion as the frame portion 358.

The first base station 105*x* may perform a scan 334 for the one or more SSBs 350 from the second base station 105*y*. In some examples, performing the scan 334 includes scanning frequencies 324 associated with global synchronization channel numbers (GSCNs) 322. To illustrate, the base stations 105*x*-*y* may comply with a wireless communication protocol that specifies the GSCNs 322 and that SSBs are to be transmitted using any of the frequencies 324. The first base station 105*x* may store GSCN data 320 indicating the GSCNs 322, the frequencies 324, other information, or a combination thereof.

The first base station 105*x* may determine a result 312 based on the scan 334. The result 312 may include or may be based on NL measurement operations performed by the first base station 105*x*. In some examples, the result 312 indicates, for each GSCN of the GSCNs 322, whether the first base station 105*x* has received and decoded a corresponding SSB of the one or more SSBs 350 from the second base station 105*y* (e.g., based on whether an SSB is detected at the frequency). In some examples, the result 312 of the scan indicates that a frequency 364 of the frequencies 324 is unused by the second base station 105*y* for transmission of the one or more SSBs 350. The particular frequency may correspond to a particular GSCN of the GSCNs 322. For example, if the first base station 105*x* fails to detect, during the scan 334, any SSBs transmitted using the frequency 364, then the result 312 may indicate the frequency 364. The result 312 may further indicate that one or more frequencies (such as the frequencies 354) are used (or occupied) by the second base station 105*y* for transmission of the one or more SSBs 350. Based on the result 312 of the scan 334 indicating that the frequency 364 is unused (or unoccupied) by the second base station 105*y* for transmission of the one or more SSBs 350, the first base station 105*x* may select the frequency 364 for transmission of one or more SSBs 360, and the first base station 105*x* may transmit the one or more SSBs 360 using the frequency 364.

In some circumstances, the first base station 105*x* may detect that all of the frequencies 324 are occupied (e.g., by receiving SSBs associated with all of the frequencies 324). In some examples, the first base station 105*x* selects a frequency from among the frequencies 324 as the frequency 364 based on the frequency having a "worst" received signal characteristic. For example, the first base station 105*x* may determine that a received signal strength indicator (RSSI) value of an SSB received via the frequency 364 is less than other RSSI values associated with other SSBs received via the other frequencies 324. In this case, transmission of the one or more SSBs 360 based on the frequency 364 may be less likely to result in collisions or interference as compared to use of the other frequencies 324.

By using the frequency 364 (e.g., instead of the frequencies 354) to transmit the one or more SSBs 360, the first base station 105*x* may reduce or avoid instances of collision between the one or more SSBs 350 and the one or more SSBs 360. In some cases, avoiding such collisions may improve performance within the wireless communication system 300, such as by increasing ability of UEs 115 to receive information, such as system information blocks (SIBs), paging messages, and random access response (RAR) messages, as illustrative examples. Selection and use of the frequency 364 may be referred to as a frequency domain based technique. Alternatively or in addition to use of a frequency domain based technique, the first base station 105*x* may use a time domain based technique.

To illustrate, during the scan 334, the first base station 105*x* may scan for the one or more SSBs 350 at times associated with the SSB indices 328. To illustrate, the base stations 105*x*-*y* may comply with a wireless communication protocol that specifies that SSBs are to be transmitted at times associated with any of the SSB indices 328. The first base station 105*x* may store SSB data 326 indicating the SSB indices 328.

In some implementations, scanning for the one or more SSBs 350 may be staggered with respect to scanning for GSCNs. To illustrate, the first base station 105*x* may determine a first unused GSCN of the GSCNs 322 (where no SSB is detected) and may then for unused SSB indices of the SSB indices 328 within the first unused GSCN. After scanning for unused SSB indices of the SSB indices 328 within the first unused GSCN, the first base station 105*x* may determine a second unused GSCN of the GSCNs 322 (where no SSB is detected) and may scan for unused SSB indices of the SSB indices 328 within the second unused GSCN. In some other implementations, scanning for the one or more SSBs 350 may be performed after completion of scanning for GSCNs. To illustrate, after identifying unused GSCNs (such as the first unused GSCN and the second unused GSCN), the first base station 105*x* may scan for unused SSB indices of the SSB indices 328 within the unused GSCNs.

In some examples, the result 312 indicates, for each SSB index of the SSB indices 328, whether the SSB index is used or unused by the second base station 105*y* for transmission of the one or more SSBs 350. To further illustrate, the result 312 of the scan 334 may indicate that the one or more SSB indices 356 are used by the second base station 105*y* to transmit the one or more SSBs 350. The result 312 of the scan 334 may also indicate that the one or more SSB indices 366 are unused by the second base station 105*y* for the transmission of the one or more SSBs 360. For example, if the first base station 105x fails to detect, during the scan 334, any SSBs transmitted using the one or more SSB indices 366, then the result 312 may indicate the one or more SSB indices 366. Based on the result 312 of the scanning 334 indicating that the one or more SSB indices 366 are unused by the second base station 105y for transmission of the one or more SSBs 350, the first base station 105x may select the one or more SSB indices 366 for transmission of the one or more SSBs 360, and the first base station 105x may transmit the one or more SSBs 360 using based on the one or more SSB indices 366.

In some implementations, the first base station 105x may use a time domain based technique as a "fall back" in case a frequency domain based technique fails to identify a frequency that is unused by the second base station 105y for transmission of the one or more SSBs 350. In some such examples, in response to determining, based on the result 312 of the scan 334, that each GSCN of the GSCNs 322 is used by the second base station 105y for transmission of the one or more SSBs 350, the first base station 105x may identify that the one or more SSB indices 366 are unused by the second base station 105y for transmission of the one or more SSBs 350.

Alternatively or in addition to one or more of a frequency domain based technique or a time domain based technique, the first base station 105x may select a frame portion 368 for transmission of the one or more SSBs 360 based on the frame portion 358 used for transmission of the one or more SSBs 350. To illustrate, the frame portion 358 may correspond to the first half of a frame, and the frame portion 368 may correspond to the second half of the frame occurring after the first half. In another example, the frame portion 358 may correspond to the second half of a frame, and the frame portion 368 may correspond to the first half of the frame occurring prior to the first half. The result 312 of the scan 334 may indicate that the frame portion 358 is used by the second base station 105y for transmission of the one or more SSBs 350, and the first base station 105x may transmit the one or more SSBs 360 during the frame portion 368.

In some examples, selection and use of the frame portion 368 (instead of the frame portion 358) may be referred to as a frame portion based technique. In some implementations, the first base station 105x may use a frame portion based technique as a "fall back" in case one or both of a frequency domain based technique or a time domain based technique fail to identify a frequency that is unused by the second base station 105y for transmission of the one or more SSBs 350. In some such examples, in response to determining, based on the result 312 of the scan 334, that each GSCN of the GSCNs 322 is used by the second base station 105y for transmission of the one or more SSBs 350 and that each SSB index of the SSB indices 328 is used by the second base station 105y for transmission of the one or more SSBs 350, the first base station 105x may identify that the frame portion 368 is unused by the second base station 105y for transmission of the one or more SSBs 350.

To further illustrate, in some examples, the result 312 of the scan 334 indicates that the frequency 364, the one or more SSB indices 366, and the frame portion 368 are unused by the second base station 105y for transmission of the one or more SSBs 350. The SSB configuration 370 may include the frequency 364, the one or more SSB indices 366, and the frame portion 368.

Although certain orders of operations have been described for illustration, other examples are also within the scope of the disclosure. For example, in some implementations, operations a time domain based technique may be performed after operations of a frame portion based technique. In some implementations, operations of a time domain based technique may be performed in parallel with operations of a frame portion based technique. To illustrate, after identifying the frequency 364, the first base station 105x may scan the SSB indices 328 within the frequency 364 during one or more frame portions to determine the one or more SSB indices 366 and the frame portion 368.

In some circumstances, the first base station 105x may fail to detect any SSBs during the scan 334, such as if the first base station 105x is not within a coverage area of another base station. In such examples, the result 312 may indicate that all of the frequencies 324 are available, that all the SSB indices 366 are available, and that the frame portions 358, 368 are available. In some other examples, the first base station 105x may receive SSBs from multiple second base stations, such as if the first base station 105x is within coverage areas of multiple base stations. As an illustrative example, the first base station 105x may be within coverage areas of both the base station 105d and the base station 105e of FIG. 1.

The first base station may transmit the one or more SSBs 360 using an SSB configuration 370 that is based on the result 312 of the scan 334. For example, the SSB configuration 370 may include or may correspond to one or more of the frequency 364, the one or more SSB indices 366, or the frame portion 368. Use of the SSB configuration 370 based on the result 312 of the scan 334 may reduce or avoid instances of collision or overlap between the one or more SSBs 350 and the one or more SSBs 360.

In some examples, the first base station 105x communicates with one or more UE devices based on the one or more SSBs 360. For example, the UE 115 may detect the one or more SSBs 360. The UE 115 may determine, based on the one or more SSBs 360, that the first base station 105x is within communication range of the UE 115 and may initiate one or more communications with the first base station 105x.

In some examples, the processor 240x detects a trigger event 310, and the first base station 105x performs the scan 334 in response to detecting the trigger event 310. To illustrate, in some examples, the trigger event 310 includes or corresponds to a boot-up operation of the first base station 105x. In some such examples, the processor 240x executes firmware, an operating system, or other instructions that include code that initiates the scan 334 during or based on the boot-up operation. For example, the code may be executable by the processor 240x to detect the boot-up operation, to access data from the memory 242x (such as the GSCN data 320, the SSB data 326, other data, or a combination there), and to provide an instruction to the receiver 332x to perform the scan 334 based on the accessed data. In some examples, the scan 334 is performed at least partially during the boot-up operation (e.g., as a background process of the boot-up operation during one or more other processes of the boot-up operation). In such examples, the first base station 105x may determine the SSB configuration 370 sooner as compared to some other implementations in which the first base station 105x performs the scan 334 after completion of the boot-up operation.

Alternatively or in addition, the trigger event 310 may include or correspond to one or more other events. In some examples, the trigger event 310 includes expiration of a threshold time interval since a previous calibration operation performed by the first base station 105x. The threshold time interval may be determined based on a particular number of minutes or seconds, based on a particular number of processing cycles (or other operations) of the processor 240x, based on one or more other criteria, or a combination thereof. In some cases, the threshold time interval corresponds to or is based on an amount of time between scheduled operations and maintenance (O&M) associated with the second base station 105y, which may involve a change in one or more of the frequencies 354, the one or more SSB indices 356, or the frame portion 358. Accordingly, the first base station 105x may periodically or occasionally re-perform the scan 334 to determine an updated result that may differ from the result 312. For example, the updated result may indicate one or more of a frequency that differs from the frequency 364, one or more SSB indices that differ from the one or more SSB indices 366, or a frame portion that differs from the frame portion 358. The first base station 105x may transmit one or more SSBs based on the updated result.

In some implementations, the scan 334 may include or correspond to a network listening (NL) scan, and performing the scan 334 may include NL measurement operations. In some examples, the NL scan includes at least one operation of a cell acquisition process performed by a UE to establish communications with the first base station based on the one or more SSBs 360. To illustrate, the operations may include, upon initiation of the scan 334, scanning the GSCNs 322 in a particular order, which may specified by an upper layer (such as an application layer) associated with instructions executed by the first base station 105x. For each scanned GSCN 322, the first base station 105x may determine a measurement value, such as an RSSI value. After determining the measurement values, the first base station 105x may identify one or more measurement values that fail to satisfy (e.g., exceed) a threshold. For example, the first base station 105x may determine a subset of measured RSSI values that exceed an RSSI threshold value and correspond to a subset of the GSCNs 322. The subset of measured RSSI values may include a particular RSSI value that is based on signals received from the second base station 105y. In some examples, the RSSI threshold value is configurable (e.g., using upper layers associated with instructions executed by the first base station 105x). In some examples, the first base station 105x selects a particular GSCN corresponding to the greatest RSSI from among the measured RSSI values (or the subset of measured RSSI values). For example, the first base station 105x may determine that the particular RSSI value that is based on signals received from the second base station 105y exceeds other measured RSSI values.

The first base station 105x may perform one or more additional operations based on the subset of the GSCNs 322 (or based on the selected particular GSCN). For example, the first base station 105x may search for a PSS and an SSS transmitted at frequencies corresponding to the subset of the GSCNs 322. As an example, the frequencies 354 may be associated with an RSSI value that satisfies the RSSI threshold value, and the first base station 105x may search the frequencies 354 for a PSS of the one or more SSBs 350 and for an SSS of the one or more SSBs 350. In response to detecting one or both of a PSS or an SSS, the first base station 105x may perform one or more timing alignment operations (e.g., to synchronize timing with the second base station 105y based on detecting a PSS and an SSS of the one or more SSBs 350), which may enable the first base station 105x to decode a PBCH to detect master information block (MIB) data. To illustrate, after synchronizing timing with the second base station 105y, the first base station 105x may decode a PBCH of the one or more SSBs 350 to detect MIB data included in the one or more SSBs 350. After detecting the MIB data, the first base station 105x may determine that the GSCN associated with the MIB data corresponds to a used GSCN.

One or more aspects described herein may improve performance of a wireless communication system. For example, by reducing or avoiding collisions and interference between the SSBs 350, 360, the UE 115 may receive the SSBs 350, 360 with a greater signal-to-noise ratio (SNR) and may connect with base stations 105x-y more rapidly. In some cases, reducing or avoiding collisions and interference between the SSBs 350, 360 may avoid a situation in which the UE 115 connects with a more distant base station due to detecting interference or collisions associated with the SSBs 350, 360. As a result, the UE 115 may connect to base stations more rapidly, may perform improved selection of base stations for communication, or both.

As another example, reducing or avoiding collisions and interference between the SSBs 350, 360 may reduce power consumption by a base station, by a UE device, or both. To illustrate, collisions and interference between the SSBs 350, 360 may cause the UE 115 to measure and report a relatively poor received signal strength to a base station (e.g., the first base station 105x or the second base station 105y). To compensate for the poor received signal strength reported by the UE 115, the base station may increase transmission power levels used by the base station and the UE 115. By reducing or avoiding collisions and interference between the SSBs 350, 360, the UE 115 may detect and report a greater received signal strength, and the base station may select lower transmission power level, resulting in power savings by the base station and the UE 115.

Figure 4:
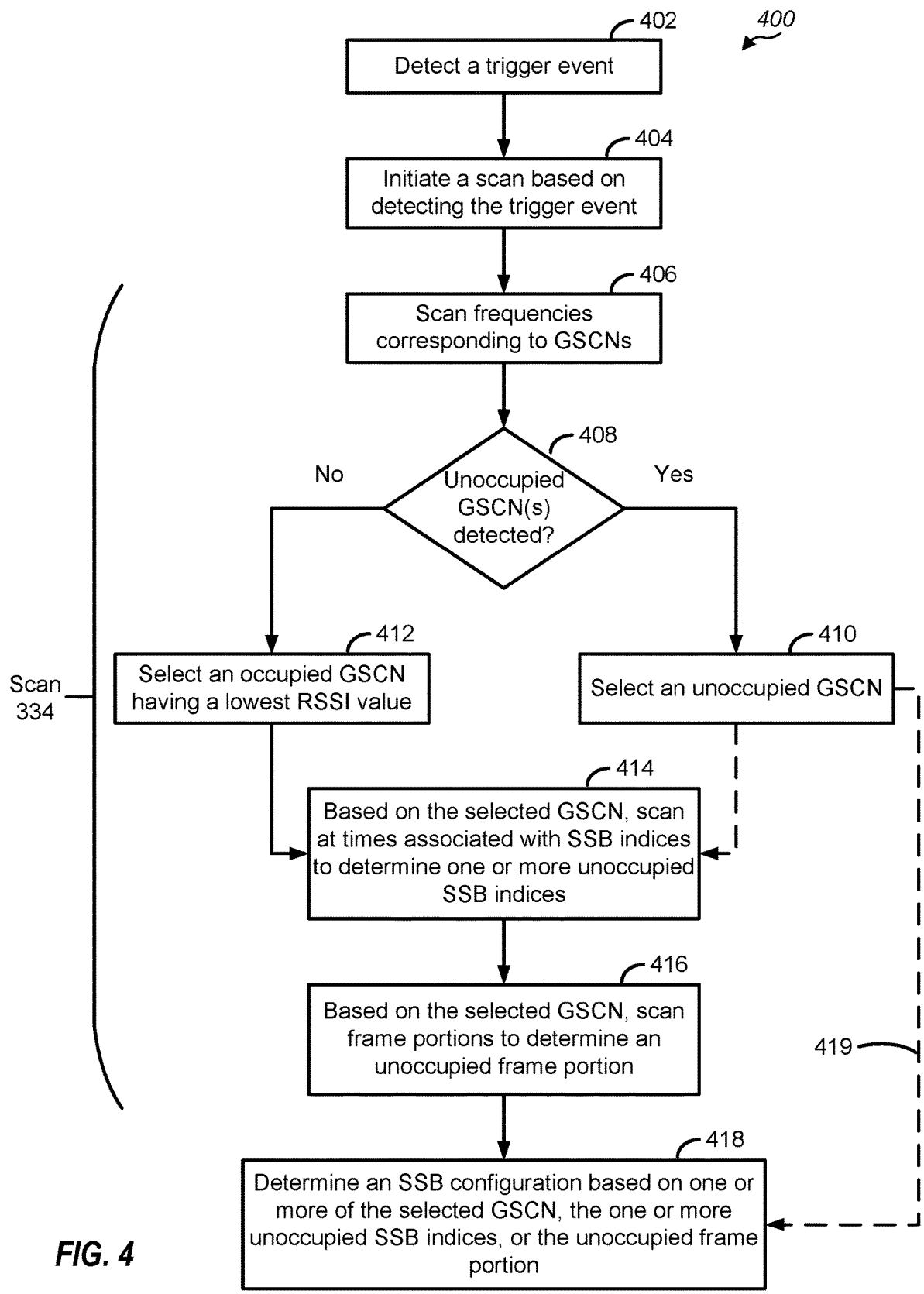
FIG. 4 is a flow chart of a method of determining a synchronization signal block (SSB) configuration according to some aspects of the disclosure.

FIG. 4 is a flow chart of a method 400 of determining an SSB configuration according to some aspects of the disclosure. In some examples, the method 400 is performed by the first base station 105x of FIG. 3.

The method 400 may include detecting a trigger event, at 402. For example, the first base station 105x may detect the trigger event 310 based on one or more operations described with reference to FIG. 3.

The method 400 may further include initiating a scan based on detecting the trigger event, at 404. For example, the first base station 105x may initiate the scan 334 based on detecting the trigger event 310. In some examples, initiating the scan 334 includes one or more operations described with reference to FIG. 3, such as accessing the GSCN data 320 and providing an instruction to the receiver 332x to scan one or more of the frequencies 324.

The method 400 may further include scanning frequencies corresponding to GSCNs, at 406. For example, the first base station 105x may scan the frequencies 324 corresponding to the GSCNs 322 using the receiver 332x.

The method 400 may further include determining whether one or more unoccupied GSCNs are detected, at 408. To illustrate, the first base station 105x may determine an RSSI value for each of the GSCNs. The first base station 105x may determine that a GSCN is occupied if the GSCN is associated with an RSSI value that satisfies an RSSI threshold. The first base station 105x may determine that a GSCN is unoccupied if the GSCN is associated with an RSSI value that satisfies an RSSI threshold (or that is zero).

In some examples, if one or more unoccupied GSCNs are detected, the method 400 may include selecting an unoccupied GSCN, at 410. For example, if the first base station 105x detects a single unoccupied GSCN, the first base station 105x may select the single unoccupied GSCN. In some other examples, if the first base station 105x detects multiple unoccupied GSCNs, the first base station 105x may select among the multiple unoccupied GSCNs using one or more selection criteria, such as by selecting the numerically highest unoccupied GSCN, by selecting the numerically lowest unoccupied GSCN, or by randomly or pseudo-randomly selecting an unoccupied GSCN, as illustrative examples. In some examples, the selected GSCN corresponds to the frequency 364.

In some other examples, if no unoccupied GSCNs are detected, the method 400 may include selecting an occupied GSCN having a lowest RSSI value, at 412. As an illustrative example, referring again to FIG. 1, the base station 105f may select, from among the GSCNs 322, the GSCN having the lowest RSSI value. In some examples, the selected GSCN corresponds to the frequency 364.

The method 400 may further include scanning, based on the selected GSCN, at times associated with SSB indices to determine one or more unoccupied SSB indices, at 414. For example, the first base station 105x may scan the frequency 364 at times associated with the SSB indices 328. In some examples, the one or more unoccupied SSB indices correspond to the one or more SSB indices 366. In some other examples, the first base station 105x may fail to identify any unoccupied SSB indices.

The method 400 may further include scanning, based on the selected GSCN, frame portions to determine an unoccupied frame portion, at 416. To illustrate, the first base station 105x may scan the frequency 364 during the frame portions 358, 368. In some examples, the unoccupied frame portion may correspond to the frame portion 368. In some other examples, the first base station 105x may fail to identify an unoccupied frame portion.

The method 400 may further include determining an SSB configuration based on one or more of the selected GSCN, the one or more unoccupied SSB indices, or the unoccupied frame portion, at 418. For example, the first base station 105x may determine the SSB configuration 370 based on one or more of the frequency 364, the one or more SSB indices 366, or the frame portion 368.

It should be appreciated that the example of FIG. 4 is illustrative and that other implementations are also within the scope of the disclosure. To illustrate, the scan 334 may include a different number, order, or type of operations than illustrated in the example of FIG. 4. As an example, in some other implementations, after selecting an unoccupied GSCN (at 410), the method 400 proceeds to determining the SSB configuration (at 418), as illustrated by 419. For example, based on detecting an unoccupied GSCN, the first base station 105x may "bypass" searching for unoccupied SSB indices (at 414) and searching for an unoccupied frame portion (at 416). In some implementations, "bypassing" such operations may enable the first base station 105x to initiate transmission of the one or more SSBs 360 sooner as compared to some other implementations, such as implementations that further "refine" the scan 334 by searching for unoccupied SSB indices and for an unoccupied frame portion. As another example, in some implementations, searching for unoccupied SSB indices (at 414) may be performed after, or concurrently with, searching for an unoccupied frame portion (at 416).

Figure 5:
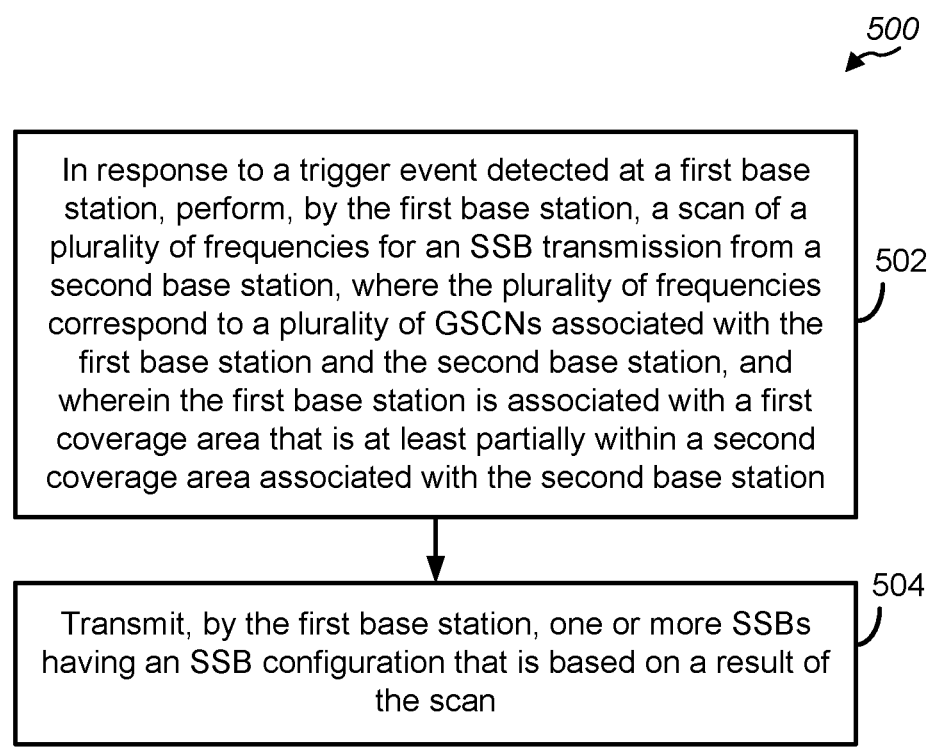
FIG. 5 is a flow chart of a method of wireless communication according to some aspects of the disclosure.

FIG. 5 is a flow chart of an example of a method 500 of wireless communication according to some aspects of the disclosure. In some examples, the method 500 is performed by the first base station 105x.

The method 500 includes, in response to a trigger event detected at a first base station, performing, by the first base station, a scan of a plurality of frequencies for an SSB transmission from a second base station, at 502. The plurality of frequencies correspond to a plurality of GSCNs associated with the first base station and the second base station, and the first base station is associated with a first coverage area that is at least partially within a second coverage area associated with the second base station. To illustrate, the first base station 105x may detect the trigger event 310 and may perform the scan 334, based on detecting the trigger event 310, of the frequencies 324 for the one or more SSBs 350 from the second base station 105y. The frequencies 324 may correspond to the GSCNs 322, and the first coverage area 302 of the first base station 105x may be at least partially within the second coverage area 304 of the second base station 105y.

The method 500 further includes transmitting, by the first base station, one or more SSBs having an SSB configuration that is based on a result of the scan, at 504. For example, the first base station 105x may transmit the one or more SSBs 360 having the SSB configuration 370, and the SSB configuration 370 may be based on the result 312.

Figure 6:
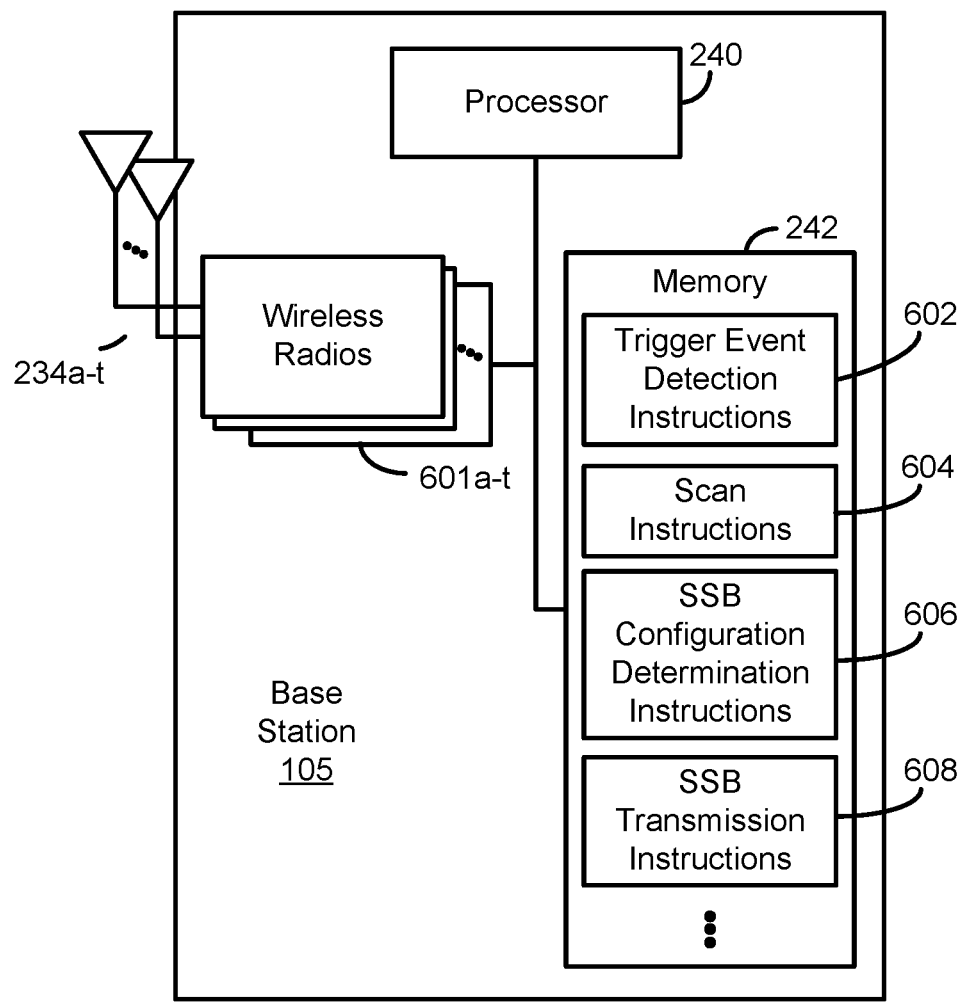
FIG. 6 is a block diagram illustrating an example of a base station according to some aspects of the disclosure.

FIG. 6 is a block diagram illustrating an example of a base station according to some aspects of the disclosure. In some examples, the base station 105 corresponds to a small cell base station, such as any of the base stations 105d, 105e, and 105x.

The base station 105 may include structure, hardware, and components illustrated in FIG. 2. For example, the base station 105 may include the processor 240, which may execute instructions stored in the memory 242. Under control of the processor 240, the base station 105 may transmit and receive signals via wireless radios 601a-t and antennas 234a-t. The wireless radios 601a-t may include one or more components or devices described herein, such as the modulator/demodulators 232a-t, the MIMO detector 236, the receive processor 238, the transmit processor 220, the TX MIMO processor 230, the transmitter 330x, the receiver 332x, one or more other components or devices, or a combination thereof.

In some examples, the memory 242 stores instructions executable by the processor 240 to initiate, perform, or control one or more operations described herein, such as operations of the method 400 of FIG. 4, operations of the method 500 of FIG. 5, or a combination thereof. To illustrate, the memory 242 may store trigger event detection instructions 602 executable by the processor 240 to detect the trigger event 310, such as by detecting a boot-up operation of the base station 105, as an illustrative example. The memory 242 may further store scan instructions 604 executable by the processor 240 to initiate, perform, or control operations of the scan 334 and to determine the result 312. The memory 242 may further store SSB configuration determination instructions 606 executable by the processor 240 to determine the SSB configuration 370 based on the result 312 of the scan 334. The memory 242 may further store SSB transmission instructions 608 executable by the processor 240 to initiate, perform, or control transmission of the one or more SSBs 360 based on the SSB configuration 370.

According to some further aspects, in a first aspect, a method of wireless communication includes, in response to a trigger event detected at a first base station, performing, by the first base station, a scan of a plurality of frequencies for an SSB transmission from a second base station. The plurality of frequencies correspond to a plurality of GSCNs associated with the first base station and the second base station. The first base station is associated with a first coverage area that is at least partially within a second coverage area associated with the second base station. The method further includes transmitting, by the first base station, one or more SSBs having an SSB configuration that is based on a result of the scan.

In a second aspect alternatively or in addition to the first aspect, the result of the scan indicates that a particular frequency is unused by the second base station for the SSB transmission, the particular frequency corresponds to a particular GSCN of the plurality of GSCNs, and the first base station transmits the one or more SSBs using the particular frequency.

In a third aspect alternatively or in addition to any of the first through second aspects, the result of the scan indicates that one or more SSB indices are unused by the second base station for the SSB transmission, and the first base station transmits the one or more SSBs based on the one or more SSB indices.

In a fourth aspect alternatively or in addition to any of the first through third aspects, the method includes: determining, based on the result of the scan, that each GSCN of the plurality of GSCNs is used by the second base station for the SSB transmission; and based on determining that each GSCN of the plurality of GSCNs is used by the second base station for the SSB transmission, identifying that the one or more SSB indices are unused by the second base station for the SSB transmission.

In a fifth aspect alternatively or in addition to any of the first through fourth aspects, the result of the scan indicates that one of a first portion of a frame or a second portion of the frame is used by the second base station for the SSB transmission, and the first base station transmits the one or more SSBs during the other of the first portion of the frame or the second portion of the frame.

In a sixth aspect alternatively or in addition to any of the first through fifth aspects, the method includes: determining, based on the result of the scan, that each GSCN of the plurality of GSCNs is used by the second base station for the SSB transmission; determining, based on the result of the scan, that each SSB index of a plurality of SSB indices are used by the second base station for the SSB transmission; and based on determining that each GSCN of the plurality of GSCNs is used by the second base station for the SSB transmission and that each SSB index of the plurality of SSB indices are used by the second base station for the SSB transmission, identifying that the other of the first portion of the frame or the second portion of the frame is unused by the second base station for the SSB transmission.

In a seventh aspect alternatively or in addition to any of the first through sixth aspects, the result of the scan indicates that a particular frequency, one or more SSB indices, and a particular frame portion are unused by the second base station for the SSB transmission, and the SSB configuration includes the particular frequency, the one or more SSB indices, and the frame portion.

In an eighth aspect alternatively or in addition to any of the first through seventh aspects, the trigger event includes a boot-up operation of the first base station.

In a ninth aspect alternatively or in addition to any of the first through eighth aspects, the trigger event includes expiration of a threshold time interval since a previous calibration operation performed by the first base station.

In a tenth aspect alternatively or in addition to any of the first through ninth aspects, the scan corresponds to an NL scan.

In an eleventh aspect alternatively or in addition to any of the first through tenth aspects, the NL scan includes at least one of a plurality of operations included in a cell acquisition process performed by a UE to establish communications with the first base station based on the one or more SSBs.

In a twelfth aspect alternatively or in addition to any of the first through eleventh aspects, the first base station corresponds to a small cell base station, and the second base station corresponds to a macro base station.

In a thirteenth aspect alternatively or in addition to any of the first through twelfth aspects, the result of the scan indicates, for each GSCN of the plurality of GSCNs, whether the first base station has received and decoded a corresponding SSB from the second base station.

In a fourteenth aspect alternatively or in addition to any of the first through thirteenth aspects, the method includes communicating with one or more UE devices based on the transmitted one or more SSBs.

In a fifteenth aspect alternatively or in addition to any of the first through fourteenth aspects, an apparatus for wireless communication includes a receiver configured to perform, in response to a trigger event detected at a first base station, a scan of a plurality of frequencies for an SSB transmission from a second base station. The plurality of frequencies correspond to a plurality of GSCNs associated with the first base station and the second base station. The first base station is associated with a first coverage area that is at least partially within a second coverage area associated with the second base station. The apparatus further includes a transmitter configured to transmit one or more SSBs having an SSB configuration that is based on a result of the scan.

In a sixteenth aspect alternatively or in addition to any of the first through fifteenth aspects, the result of the scan indicates that a particular frequency is unused by the second base station for the SSB transmission, the particular frequency corresponds to a particular GSCN of the plurality of GSCNs, and the transmitter is further configured to transmit the one or more SSBs using the particular frequency.

In a seventeenth aspect alternatively or in addition to any of the first through sixteenth aspects, the result of the scan indicates that one or more SSB indices are unused by the second base station for the SSB transmission, and the transmitter is further configured to transmit the one or more SSBs based on the one or more SSB indices.

In an eighteenth aspect alternatively or in addition to any of the first through seventeenth aspects, the apparatus includes a processor configured to determine, based on the result of the scan, that each GSCN of the plurality of GSCNs is used by the second base station for the SSB transmission and to identify, based on determining that each GSCN of the plurality of GSCNs is used by the second base station for the SSB transmission, that the one or more SSB indices are unused by the second base station for the SSB transmission.

In a nineteenth aspect alternatively or in addition to any of the first through eighteenth aspects, the result of the scan indicates that one of a first portion of a frame or a second portion of the frame is used by the second base station for the SSB transmission, and the transmitter is further configured to transmit the one or more SSBs during the other of the first portion of the frame or the second portion of the frame.

In a twentieth aspect alternatively or in addition to any of the first through nineteenth aspects, the apparatus includes a processor configured to: determine, based on the result of the scan, that each GSCN of the plurality of GSCNs is used by the second base station for the SSB transmission; determine, based on the result of the scan, that each SSB index of a plurality of SSB indices are used by the second base station for the SSB transmission; and based on determining that each GSCN of the plurality of GSCNs is used by the second base station for the SSB transmission and that each SSB index of the plurality of SSB indices are used by the second base station for the SSB transmission, identify that the other of the first portion of the frame or the second portion of the frame is unused by the second base station for the SSB transmission.

In a twenty-first aspect alternatively or in addition to any of the first through twentieth aspects, the result of the scan indicates that a particular frequency, one or more SSB indices, and a particular frame portion are unused by the second base station for the SSB transmission, and the SSB configuration includes the particular frequency, the one or more SSB indices, and the frame portion.

In a twenty-second aspect alternatively or in addition to any of the first through twenty-first aspects, the trigger event includes a boot-up operation of the first base station.

In a twenty-third aspect alternatively or in addition to any of the first through twenty-second aspects, the trigger event includes expiration of a threshold time interval since a previous calibration operation performed by the first base station.

In a twenty-fourth aspect alternatively or in addition to any of the first through twenty-third aspects, the scan corresponds to an NL scan.

In a twenty-fifth aspect alternatively or in addition to any of the first through twenty-fourth aspects, the NL scan includes at least one of a plurality of operations included in a cell acquisition process performed by a UE to establish communications with the first base station based on the one or more SSBs.

In a twenty-sixth aspect alternatively or in addition to any of the first through twenty-fifth aspects, the first base station corresponds to a small cell base station, and the second base station corresponds to a macro base station.

In a twenty-seventh aspect alternatively or in addition to any of the first through twenty-sixth aspects, the result of the scan indicates, for each GSCN of the plurality of GSCNs, whether the first base station has received and decoded a corresponding SSB from the second base station.

In a twenty-eighth aspect alternatively or in addition to any of the first through twenty-seventh aspects, the transmitter is further configured to communicate with one or more UE devices based on the transmitted one or more SSBs.

In a twenty-ninth aspect alternatively or in addition to any of the first through twenty-eighth aspects, a non-transitory computer-readable medium stores instructions executable by a processor to initiate, perform, or control operations. The operations include, in response to a trigger event detected at a first base station, performing, by the first base station, a scan of a plurality of frequencies for an SSB transmission from a second base station. The plurality of frequencies correspond to a plurality of GSCNs associated with the first base station and the second base station. The first base station is associated with a first coverage area that is at least partially within a second coverage area associated with the second base station. The operations further include transmitting, by the first base station, one or more SSBs having an SSB configuration that is based on a result of the scan.

In a thirtieth aspect alternatively or in addition to any of the first through twenty-ninth aspects, the result of the scan indicates that a particular frequency is unused by the second base station for the SSB transmission, the particular frequency corresponds to a particular GSCN of the plurality of GSCNs, and the first base station transmits the one or more SSBs using the particular frequency.

In a thirty-first aspect alternatively or in addition to any of the first through thirtieth aspects, the result of the scan indicates that one or more SSB indices are unused by the second base station for the SSB transmission, and the first base station transmits the one or more SSBs based on the one or more SSB indices.

In a thirty-second aspect alternatively or in addition to any of the first through thirty-first aspects, the operations further include: determining, based on the result of the scan, that each GSCN of the plurality of GSCNs is used by the second base station for the SSB transmission; and based on determining that each GSCN of the plurality of GSCNs is used by the second base station for the SSB transmission, identifying that the one or more SSB indices are unused by the second base station for the SSB transmission.

In a thirty-third aspect alternatively or in addition to any of the first through thirty-second aspects, the result of the scan indicates that one of a first portion of a frame or a second portion of the frame is used by the second base station for the SSB transmission, and the first base station transmits the one or more SSBs during the other of the first portion of the frame or the second portion of the frame.

In a thirty-fourth aspect alternatively or in addition to any of the first through thirty-third aspects, the operations include: determining, based on the result of the scan, that each GSCN of the plurality of GSCNs is used by the second base station for the SSB transmission; determining, based on the result of the scan, that each SSB index of a plurality of SSB indices are used by the second base station for the SSB transmission; and based on determining that each GSCN of the plurality of GSCNs is used by the second base station for the SSB transmission and that each SSB index of the plurality of SSB indices are used by the second base station for the SSB transmission, identifying that the other of the first portion of the frame or the second portion of the frame is unused by the second base station for the SSB transmission.

In a thirty-fifth aspect alternatively or in addition to any of the first through thirty-fourth aspects, the result of the scan indicates that a particular frequency, one or more SSB indices, and a particular frame portion are unused by the second base station for the SSB transmission, and the SSB configuration includes the particular frequency, the one or more SSB indices, and the frame portion.

In a thirty-sixth aspect alternatively or in addition to any of the first through thirty-fifth aspects, an apparatus for wireless communication includes means for performing, in response to a trigger event detected at a first base station, a scan of a plurality of frequencies for an SSB transmission from a second base station. The plurality of frequencies correspond to a plurality of GSCNs associated with the first base station and the second base station. The first base station is associated with a first coverage area that is at least partially within a second coverage area associated with the second base station. The apparatus further includes means for transmitting, by the first base station, one or more SSBs having an SSB configuration that is based on a result of the scan.

In a thirty-seventh aspect alternatively or in addition to any of the first through thirty-sixth aspects, the trigger event includes a boot-up operation of the first base station.

In a thirty-eighth aspect alternatively or in addition to any of the first through thirty-seventh aspects, the trigger event includes expiration of a threshold time interval since a previous calibration operation performed by the first base station.

In a thirty-ninth aspect alternatively or in addition to any of the first through thirty-eighth aspects, the scan corresponds to an NL scan.

In a fortieth aspect alternatively or in addition to any of the first through thirty-ninth aspects, the NL scan includes at least one of a plurality of operations included in a cell acquisition process performed by a UE to establish communications with the first base station based on the one or more SSBs.

Those of skill in the art would understand that information and signals may be represented using any of a variety of different technologies and techniques. For example, data, instructions, commands, information, signals, bits, symbols, and chips may be represented by voltages, currents, electromagnetic waves, magnetic fields or particles, optical fields or particles, or any combination thereof.

One or more components, functional blocks, and devices described herein (e.g., the functional blocks in FIG. 2) may include one or more processors, electronics devices, hardware devices, electronics components, logic circuits, memories, software codes, firmware codes, or any combination thereof. In addition, features described herein may be implemented via specialized processor circuitry, via executable instructions, and/or combinations thereof.

Those of skill would further appreciate that the various illustrative logical blocks, devices, circuits, and operations (e.g., the logical blocks in FIG. 4) described herein may be implemented as electronic hardware, computer software, or combinations of both. To illustrate, various illustrative components, blocks, devices, circuits, and operations have been described above generally in terms of their functionality. Whether such functionality is implemented as hardware or software depends upon the particular application and design of the overall system. Skilled artisans may implement the described functionality in varying ways for each particular application, but such implementation decisions should not be interpreted as a departure from the scope of the disclosure. Skilled artisans will also readily recognize that the order or combination of components, methods, or interactions that are described herein are examples and that the components, methods, or interactions of the various aspects of the disclosure may be combined or performed in ways other than those illustrated and described herein.

The various illustrative logical blocks, modules, and circuits described herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method, process, or algorithm described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
   in response to a trigger event detected at a first base station, performing, by the first base station, a scan of a plurality of frequencies for a synchronization signal block (SSB) transmission from a second base station, wherein the plurality of frequencies correspond to a plurality of global synchronization channel numbers (GSCNs) associated with the first base station and the second base station, and wherein the first base station is associated with a first coverage area that is at least partially within a second coverage area associated with the second base station; and transmitting, by the first base station, one or more SSBs having an SSB configuration that is based on a result of the scan.

2. The method of claim 1, wherein the result of the scan indicates that a particular frequency is unused by the second base station for the SSB transmission, wherein the particular frequency corresponds to a particular GSCN of the plurality of GSCNs, and wherein the first base station transmits the one or more SSBs using the particular frequency.

3. The method of claim 1, wherein the result of the scan indicates that one or more SSB indices are unused by the second base station for the SSB transmission, and wherein the first base station transmits the one or more SSBs based on the one or more SSB indices.

4. The method of claim 3, further including:
determining, based on the result of the scan, that each GSCN of the plurality of GSCNs is used by the second base station for the SSB transmission; and
based on determining that each GSCN of the plurality of GSCNs is used by the second base station for the SSB transmission, identifying that the one or more SSB indices are unused by the second base station for the SSB transmission.

5. The method of claim 1, wherein the result of the scan indicates that one of a first portion of a frame or a second portion of the frame is used by the second base station for the SSB transmission, and wherein the first base station transmits the one or more SSBs during the other of the first portion of the frame or the second portion of the frame.

6. The method of claim 5, further including:
determining, based on the result of the scan, that each GSCN of the plurality of GSCNs is used by the second base station for the SSB transmission;
determining, based on the result of the scan, that each SSB index of a plurality of SSB indices are used by the second base station for the SSB transmission; and
based on determining that each GSCN of the plurality of GSCNs is used by the second base station for the SSB transmission and that each SSB index of the plurality of SSB indices are used by the second base station for the SSB transmission, identifying that the other of the first portion of the frame or the second portion of the frame is unused by the second base station for the SSB transmission.

7. The method of claim 1, wherein the result of the scan indicates that a particular frequency, one or more SSB indices, and a particular frame portion are unused by the second base station for the SSB transmission, and wherein the SSB configuration includes the particular frequency, the one or more SSB indices, and the frame portion.

8. The method of claim 1, wherein the trigger event includes a boot-up operation of the first base station.

9. The method of claim 1, wherein the trigger event includes expiration of a threshold time interval since a previous calibration operation performed by the first base station.

10. The method of claim 1, wherein the scan corresponds to a network listening (NL) scan.

11. The method of claim 10, wherein the NL scan includes at least one of a plurality of operations included in a cell acquisition process performed by a user equipment (UE) to establish communications with the first base station based on the one or more SSBs.

12. The method of claim 1, wherein the first base station corresponds to a small cell base station, and wherein the second base station corresponds to a macro base station.

13. The method of claim 1, wherein the result of the scan indicates, for each GSCN of the plurality of GSCNs, whether the first base station has received and decoded a corresponding SSB from the second base station.

14. The method of claim 1, further including communicating with one or more user equipment (UE) devices based on the transmitted one or more SSBs.

15. An apparatus for wireless communication, comprising:
a receiver configured to perform, in response to a trigger event detected at a first base station, a scan of a plurality of frequencies for a synchronization signal block (SSB) transmission from a second base station, wherein the plurality of frequencies correspond to a plurality of global synchronization channel numbers (GSCNs) associated with the first base station and the second base station, and wherein the first base station is associated with a first coverage area that is at least partially within a second coverage area associated with the second base station; and
a transmitter configured to transmit one or more SSBs having an SSB configuration that is based on a result of the scan.

16. The apparatus of claim 15, wherein the result of the scan indicates that a particular frequency is unused by the second base station for the SSB transmission, wherein the particular frequency corresponds to a particular GSCN of the plurality of GSCNs, and wherein the transmitter is further configured to transmit the one or more SSBs using the particular frequency.

17. The apparatus of claim 15, wherein the result of the scan indicates that one or more SSB indices are unused by the second base station for the SSB transmission, and wherein the transmitter is further configured to transmit the one or more SSBs based on the one or more SSB indices.

18. The apparatus of claim 17, further including a processor configured to:
determine, based on the result of the scan, that each GSCN of the plurality of GSCNs is used by the second base station for the SSB transmission; and
identify, based on determining that each GSCN of the plurality of GSCNs is used by the second base station for the SSB transmission, that the one or more SSB indices are unused by the second base station for the SSB transmission.

19. The apparatus of claim 15, wherein the result of the scan indicates that one of a first portion of a frame or a second portion of the frame is used by the second base station for the SSB transmission, and wherein the transmitter is further configured to transmit the one or more SSBs during the other of the first portion of the frame or the second portion of the frame.

20. The apparatus of claim 19, further including a processor configured to:
determine, based on the result of the scan, that each GSCN of the plurality of GSCNs is used by the second base station for the SSB transmission;
determine, based on the result of the scan, that each SSB index of a plurality of SSB indices are used by the second base station for the SSB transmission; and
based on determining that each GSCN of the plurality of GSCNs is used by the second base station for the SSB transmission and that each SSB index of the plurality of SSB indices are used by the second base station for the SSB transmission, identify that the other of the first portion of the frame or the second portion of the frame is unused by the second base station for the SSB transmission.

21. The apparatus of claim 15, wherein the result of the scan indicates that a particular frequency, one or more SSB indices, and a particular frame portion are unused by the second base station for the SSB transmission, and wherein the SSB configuration includes the particular frequency, the one or more SSB indices, and the frame portion.

22. The apparatus of claim 15, wherein the trigger event includes a boot-up operation of the first base station.

23. The apparatus of claim 15, wherein the trigger event includes expiration of a threshold time interval since a previous calibration operation performed by the first base station.

24. The apparatus of claim 15, wherein the scan corresponds to a network listening (NL) scan.

25. The apparatus of claim 24, wherein the NL scan includes at least one of a plurality of operations included in a cell acquisition process performed by a user equipment (UE) to establish communications with the first base station based on the one or more SSBs.

26. The apparatus of claim 15, wherein the first base station corresponds to a small cell base station, and wherein the second base station corresponds to a macro base station.

27. The apparatus of claim 15, wherein the result of the scan indicates, for each GSCN of the plurality of GSCNs, whether the first base station has received and decoded a corresponding SSB from the second base station.

28. The apparatus of claim 15, wherein the transmitter is further configured to communicate with one or more user equipment (UE) devices based on the transmitted one or more SSBs.

29. A non-transitory computer-readable medium storing instructions executable by a processor to initiate, perform, or control operations, the operations comprising:
   in response to a trigger event detected at a first base station, performing, by the first base station, a scan of a plurality of frequencies for a synchronization signal block (SSB) transmission from a second base station, wherein the plurality of frequencies correspond to a plurality of global synchronization channel numbers (GSCNs) associated with the first base station and the second base station, and wherein the first base station is associated with a first coverage area that is at least partially within a second coverage area associated with the second base station; and
   transmitting, by the first base station, one or more SSBs having an SSB configuration that is based on a result of the scan.

30. An apparatus for wireless communication, comprising:
   means for performing, in response to a trigger event detected at a first base station, a scan of a plurality of frequencies for a synchronization signal block (SSB) transmission from a second base station, wherein the plurality of frequencies correspond to a plurality of global synchronization channel numbers (GSCNs) associated with the first base station and the second base station, and wherein the first base station is associated with a first coverage area that is at least partially within a second coverage area associated with the second base station; and
   means for transmitting, by the first base station, one or more SSBs having an SSB configuration that is based on a result of the scan.

* * * * *